United States Patent
Chien et al.

(10) Patent No.: US 8,300,894 B2
(45) Date of Patent: Oct. 30, 2012

(54) METHOD FOR DECOMPOSITION AND RENDERING OF VIDEO CONTENT AND USER INTERFACE FOR OPERATING THE METHOD THEREOF

(75) Inventors: Shao-Yi Chien, Taipei (TW); Jui-Hsin Lai, Taipei (TW)

(73) Assignee: National Taiwan University, Taipei (TW)

( * ) Notice: Subject to any disclaimer, the term of this patent is extended or adjusted under 35 U.S.C. 154(b) by 668 days.

(21) Appl. No.: 12/458,042

(22) Filed: Jun. 30, 2009

(65) Prior Publication Data
US 2010/0254574 A1    Oct. 7, 2010

(30) Foreign Application Priority Data
Apr. 7, 2009   (TW) ................................ 98111457 A

(51) Int. Cl.
*G06K 9/00*    (2006.01)
(52) U.S. Cl. ........ 382/107; 382/175; 382/180; 382/190; 382/206; 382/236; 382/282; 386/235; 345/619; 345/620; 725/37
(58) Field of Classification Search .................. None
See application file for complete search history.

(56) References Cited

U.S. PATENT DOCUMENTS

| | | | |
|---|---|---|---|
| 4,979,049 A | | 12/1990 | Chamzas et al. |
| 5,031,053 A | | 7/1991 | Chamzas et al. |
| 5,729,471 A | * | 3/1998 | Jain et al. ...................... 725/131 |
| 5,745,126 A | * | 4/1998 | Jain et al. ...................... 382/154 |
| 5,774,593 A | * | 6/1998 | Zick et al. ...................... 382/236 |
| 6,526,183 B1 | * | 2/2003 | Bonnet et al. ................... 382/284 |
| 7,477,794 B2 | | 1/2009 | Lefebvre et al. |
| 2005/0271269 A1 | * | 12/2005 | Errico et al. ..................... 382/164 |
| 2010/0309973 A1 | * | 12/2010 | Chien et al. ............. 375/240.02 |

FOREIGN PATENT DOCUMENTS
TW        I261192        7/2005

OTHER PUBLICATIONS

Lai et al., "Tennis video enrichment with content layer separation and real-time rendering in sprite plane," Oct. 8-10, 2008, IEEE, pp. 672-675.*
Jui-Hsin Lai and Shao-Yi Chien, Tennis Video 2.0: A New Framework of Sport Video Applications, MM'07, Sep. 23-28, 2007, Augsburg, Bavaria, Germany. ACM 978-1-59593-701-8/07/2009.

(Continued)

*Primary Examiner* — John Lee
(74) *Attorney, Agent, or Firm* — Rosenberg, Klein & Lee

(57) ABSTRACT

A method for decomposition and rendering of video content and user interface for operating the method thereof is disclosed. First, a plurality of target shots are recognized from a video, the video is decomposed into a plurality of video units based on the playtime of each target shot. Then, the video frame of target shot is decomposed into a background scene and at least one foreground object. The editing process is performed on the background to generate the plentiful visual effect. The video content of each video unit is known by analyzing the information of the foreground object, and therefore each video unit can be annotated. Furthermore, the user interface reintegrates the foreground object in the background scene and generates the customized video content according to users' request, so that viewers may get more enjoyment on game watching.

12 Claims, 16 Drawing Sheets

OTHER PUBLICATIONS

Jui-Hsin Lai and Shao-Yi Chien, Tennis Video Enrichment with Content Layer Separation and Real-Time Rendering in Sprite Plane, IEEE, Oct. 8, 2008, PID-311, Marlin Room 1, Shangri-la Hotel, Cairns, Australia.

Jui-Hsin Lai and Shao-Yi Chien, Baseball and Tennis Video Annotation with Temporal Structure Decomposition, IEEE, Oct. 8, 2008, PID-312, Marlin Room 1, Shangri-la Hotel, Cairns, Australia.

* cited by examiner

METHOD FOR DECOMPOSITION AND RENDERING OF VIDEO CONTENT AND USER INTERFACE FOR OPERATING THE METHOD THEREOF

FIELD OF THE INVENTION

The present invention is related to a method for decomposition and rendering of video content and user interface for operating the method thereof, used for providing a user with customized and interactive video content.

BACKGROUND OF THE INVENTION

Watching sport games is a popular entertainment in the life. Most people watch the games via television or computer and often discuss the video highlight with friends. In current sportscasts, however, it is usually only allowed for people to accept a video content provided by the broadcaster unilaterally, while the selectively sport watching is not provided to a viewer. In addition, the game proceedings are often interrupted by advertisement, and the game exciting is also decreased.

Furthermore, during the living broadcast of a game, it is generally not allowed for the viewer to selectively replay the broadcasted video highlight of the game at the same time, reducing the degree of tightness in a whole game.

Therefore, how to provide a customized and interactive game video for the viewer and thus more enjoyment on game watching is the object to be achieved by the present invention.

SUMMARY OF THE INVENTION

It is one object of the present invention to provide a method for decomposition and rendering of video content, comprising detecting a plurality of target shots in a video, decomposing the video frame of the target shots into a background scene and at least one foreground object, performing edition on the background scene to generate an enriched visual effect, and then reintegrating the at least one foreground object in the background scene so as to render a customized video content, resulting in more enjoyment on game watching obtained by a video viewer.

It is another object of the present invention to provide a method for decomposition and rendering of video content, comprising decomposing a video into a plurality of video units, as well as analyzing, annotating, and sorting with respect to a video content of each video units so as to allow a viewer to click a desired video unit immediately via the annotated and sorted video units.

It is further object of the present invention to provide a user interface for operating video content, through which a viewer operates the video content interactively, therefore, enjoyment on game watching can be increased.

It is further object of the present invention to provide a user interface for operating video content, providing a strategy searching function in such a way a viewer is allowed to mark at least one symbol in a play field shown in a play window of the user interface, and then these labels can be transformed into a hit pattern by the strategy searching function. As such, a video unit with the corresponding hit pattern can be searched out of the video, thereby facilitating to quickly browse to a hit frame of interest.

To achieve above objects, the present invention provides a method for decomposition of video content, comprising the steps of: providing a video comprising a plurality of shots; detecting all the shots of the video on the basis of a reference shot to recognize a plurality of target shots similar to the reference shot, each target shot comprising a sequence of video frame, the video frame comprising a background scene and at least one foreground object; decomposing the video into a plurality of video units based on the play time of each target shot; transforming the video frame into a sprite plane via a first transformation process; filtering off the at least one foreground object out of the sprite plane; transforming the sprite plane into a reconstructed frame via a second transformation process; and comparing the frame difference between the reconstructed frame and the video frame having all the at least one foreground object, so as to separate each foreground object.

The present invention further provides a method for rendering of video content, comprising the steps of: transforming the sprite plane into a watching frame via a third transformation process; and pasting each of the at least one foreground object to the watching frame.

The present invention further provides a method for rendering of video content, comprising the steps of: inserting an advertisement, a text comment, or a score box into the sprite plane; transforming the sprite plane into a watching frame via a third transformation process; and pasting each of the at least one foreground object to the watching frame.

The present invention further provides a user interface for operating video content, the configuration thereof comprising: a channel selection block used for selecting a television channel having a video comprising a plurality of video units; a play window used for playing the video units; a function block used for operating the video units to play, pause, or stop; and a video content annotation block listing all the video units having annotations on hit events; wherein a watching frame of each video unit comprises a background scene and at least one foreground object.

DETAILED DESCRIPTION OF THE INVENTION

Figure 1:
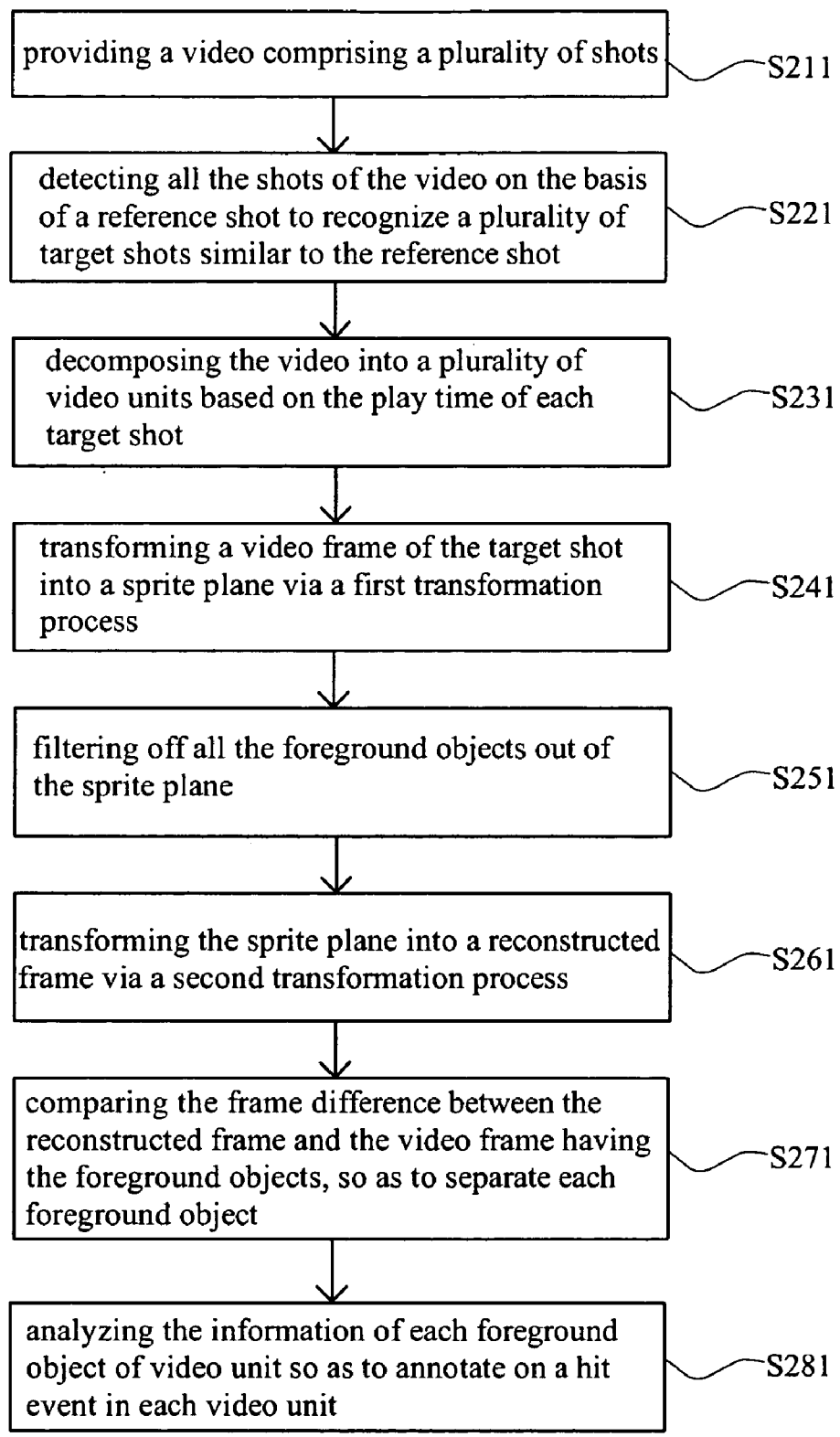
FIG. 1 is a flow chart of a method for decomposition of video content according to one embodiment of the present invention.

Referring to FIG. 1, there is shown a flow chart of a method for decomposition of video content according to one embodiment of the present invention. First, as described in step S211, the present invention provides a video 100 comprising a plurality of shots 111. The method for decomposition of video content of the embodiment can be applied to a tennis game video.

Figure 2:
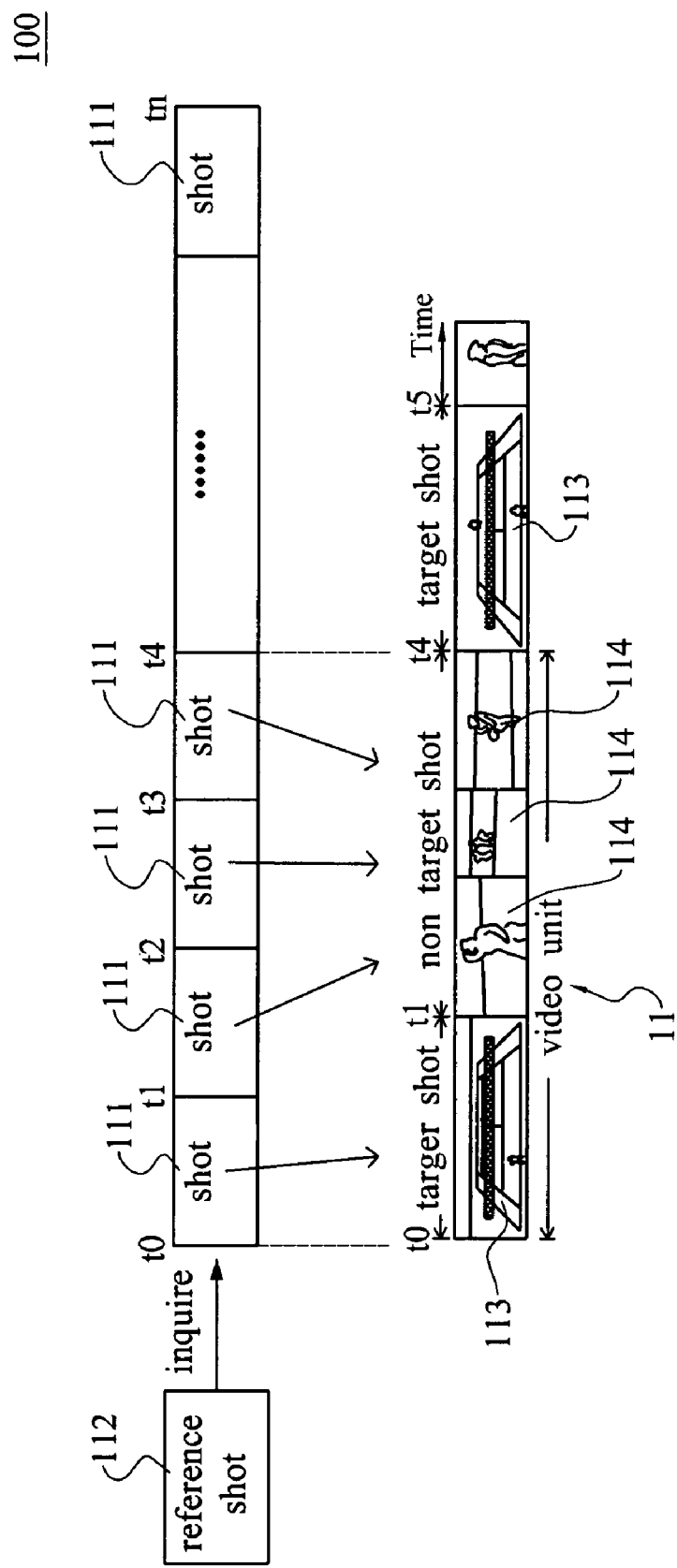
FIG. 2 is a diagram showing the structure of video according to the present invention.

In the present invention, as described in step S221, a reference shot 112 is used to detect each shot 111 of the video to recognize a plurality of target shots 113 similar to the reference shot 112, as shown in FIG. 2. A color histogram is used for the recognition of the similarity degree between shots in the present invention. If color histograms of two shots are identical, a calculation result of 1 can be obtained. Moreover, in the present invention, a threshold, such as above 0.7, is preset for the recognition of similarity degree.

Figure 3:
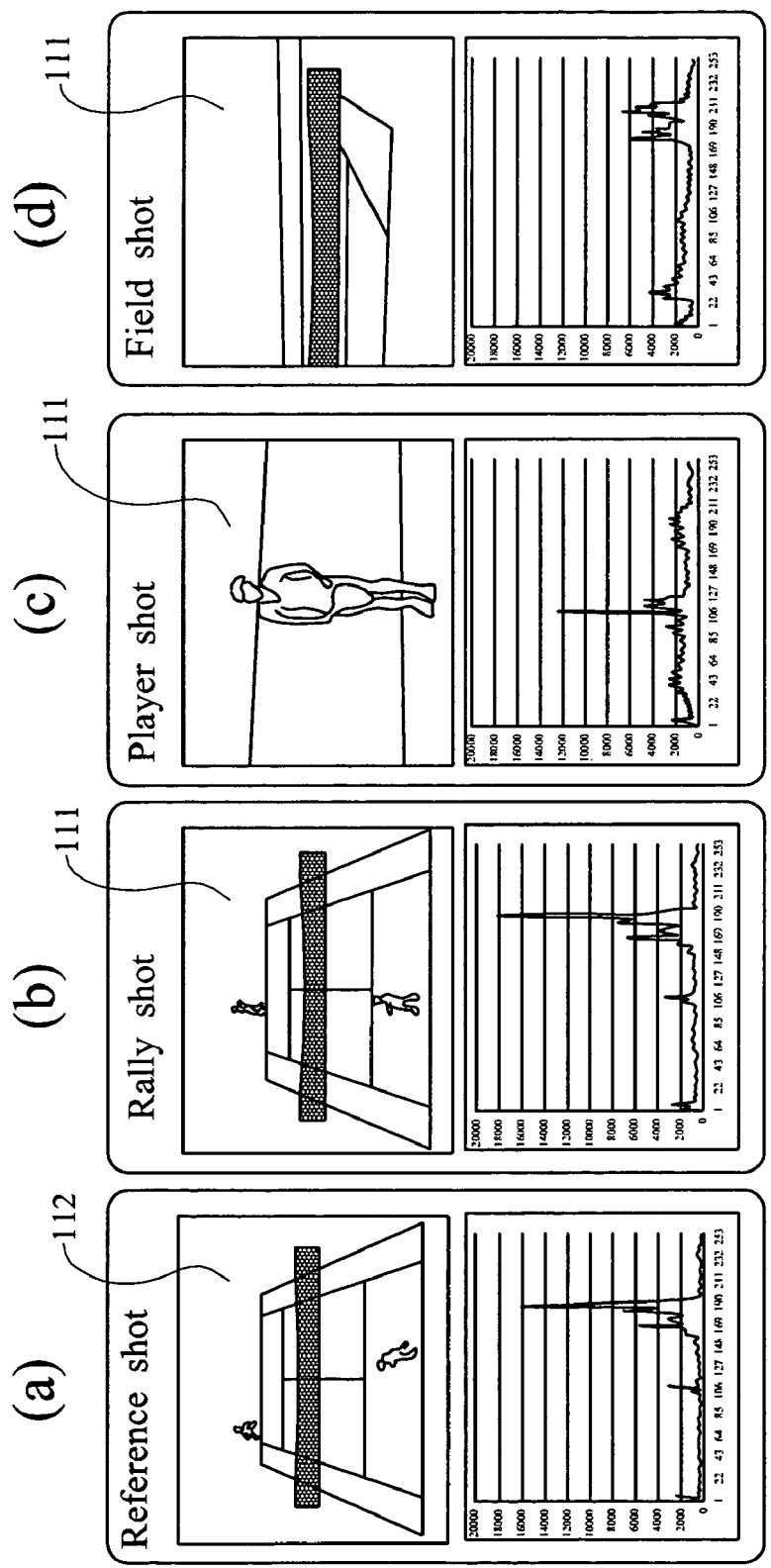
FIG. 3 shows color histograms of a reference shot and other shots according to the present invention.

Referring to FIG. 3 as an example, a serve shot is designated as the reference shot 112 of the embodiment, as shown in FIG. 3(a). The other three shots 111 to be inquired can be a rally shot, a player shot, and a field shot, respectively, as shown in FIGS. 3(b) to (d). For each shot 111/112, there has the unique color distribution histogram. Subsequently, calculation of similarity degree can be performed for three shots 111 with respect to the reference shot 112, the calculation results therefrom being 0.903 (rally shot), 0.215 (player shot), and 0.307 (field shot), respectively.

On the basis of the calculation of similarity degree, it is found the similarity degree between the rally shot 111 and the reference shot 112 is much greater than the preset threshold of the present invention, in such a way the rally shot 111 is identified as the target shot 113 to be recognized in the present invention. Namely, the rally shot 111 contains the information that is related to the serve shot. In this way, all the target shots 113 in the game video can be recognized. Furthermore, when the reference shot 112 of the embodiment is used for the recognition of each shot 111, the rules for the layout of the play field can be included as the clues for recognition, such as lines, corners, and regions surrounded thereby. Rapid recognition of each target shot 113 is allowed with the consideration of these clues for recognition.

In another embodiment of the present invention, it is surely to selectively designate a closed-up shot of the player or another type of shot as the reference shot 112. Thereby, the target shots 113 in the video 100 can be classified depending on different types.

Figure 4:
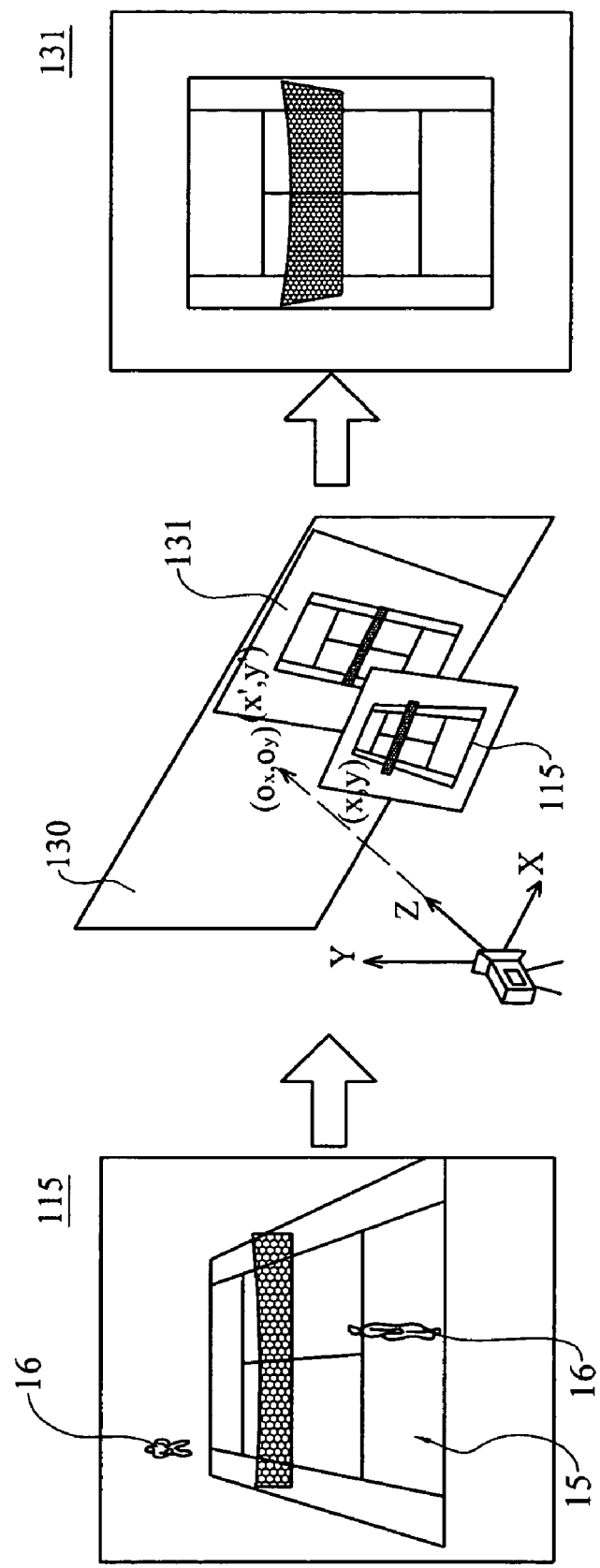
FIG. 4 is a diagram showing a process of transformation from a video frame into a sprite plane according to the present invention.

Further, the target shot 113 comprises a sequence of video frame 115, this video frame 115 comprising a background scene 15 and at least one foreground object 16, as shown in FIG. 4.

In step S231, after each target shot 113 is recognized, the video can be decomposed into a plurality of video units 11 based on the playtime of the target shot 113. Each video unit 11 representing a hit event, such as Ace, Double, Volley, Break point, Rally, etc., in the tennis video, and the video length of each video unit 11 begins at a serve shot and ends before the next serve shot, as shown in FIG. 2. In a baseball video, for example, the hit event can be Hit, Walk, Strike out, Field out, Stolen base, Double play, Double (2B), Triple (3B), and Home run, etc.

Subsequently, separation of the background scene 15 and the foreground objects 16 from the target shot 113 of each video unit 11 is an essential task before the analysis of video content of each video unit 11 is performed. As described in step S241, to build the background scene 15 and segment each foreground object 16, the sprite plane 131 is employed. The sprite plane 131 is a bird's eye view of a fiducial coordination system, generated from the video frame 115 of the target shot 113 through a first transformation process. The first transformation process is a coordination transformation process with matrix $M_{V2S}$. For the video frames 115 of the target shot 113, the video frames 115 viewed at different angles can be formed in a large background view 130 in succession through the coordination transformation of matrix $M_{V2S}$, so as to generate the sprite plane 131, as shown in FIG. 4. The transformation is performed as per formula (1) shown as follows:

$$\begin{bmatrix} x' \\ y' \\ w' \end{bmatrix} = M_{V2S} \begin{bmatrix} x \\ y \\ 1 \end{bmatrix} = \begin{bmatrix} m_{v1} & m_{v2} & m_{v3} \\ m_{v4} & m_{v5} & m_{v6} \\ m_{v7} & m_{v8} & 1 \end{bmatrix} \begin{bmatrix} x \\ y \\ 1 \end{bmatrix} \quad (1)$$

Wherein, $m_{v1}$ to $m_{v8}$ are transformation factors of the matrix $M_{V2S}$, used for the transformation of the position coordination (x, y) in the video frame 115 into the position coordination (x'/w', y'/w') in the sprite plane 131.

Further, as described in step S251, before the transformation of the video frame 115 of the target frame 113 into the sprite plane 131 of the fiducial coordination is performed, for obtaining the sprite plane 131 having the background scene 15 only, all the foreground objects 16 must be filtered off. In general situation, the foreground objects 16 (e.g., a player, ball) don't occupy the fixed region of a long time, therefore, the maximum histogram bin of the pixel value distribution in temporal domain should be the background scene 15. This can be illustrated by formulas (2) and (3) shown as follows:

$$h_{xi,yi}(k) = \#\{I_t(x_i, y_i) \mid I_t(x_i, y_i) = k, \forall t \in [t_1, t_2]\} \quad (2)$$

$$S(x_i, y_i) = \underset{k}{\arg\max}\, h_{xi,yi}(k) \quad (3)$$

Wherein, $h_{xi, yi}(k)$ is a histogram bin of the pixel value for a period of time [t1, t2] at individual position coordination ($x_i$, $y_i$) in the video frame 115. $S(x_i, y_i)$ are extracted the bin index with maximum histogram value from the histogram bins $h_{xi, yi}(k)$, and the pixel value of sprite plane 131 at the coordination ($x_i$, $y_i$). Besides, $S(x_i, y_i)$ contains information of the background scene 15 only, and all the foreground objects 16 are filtered off in the sprite plane 131.

Figure 5:
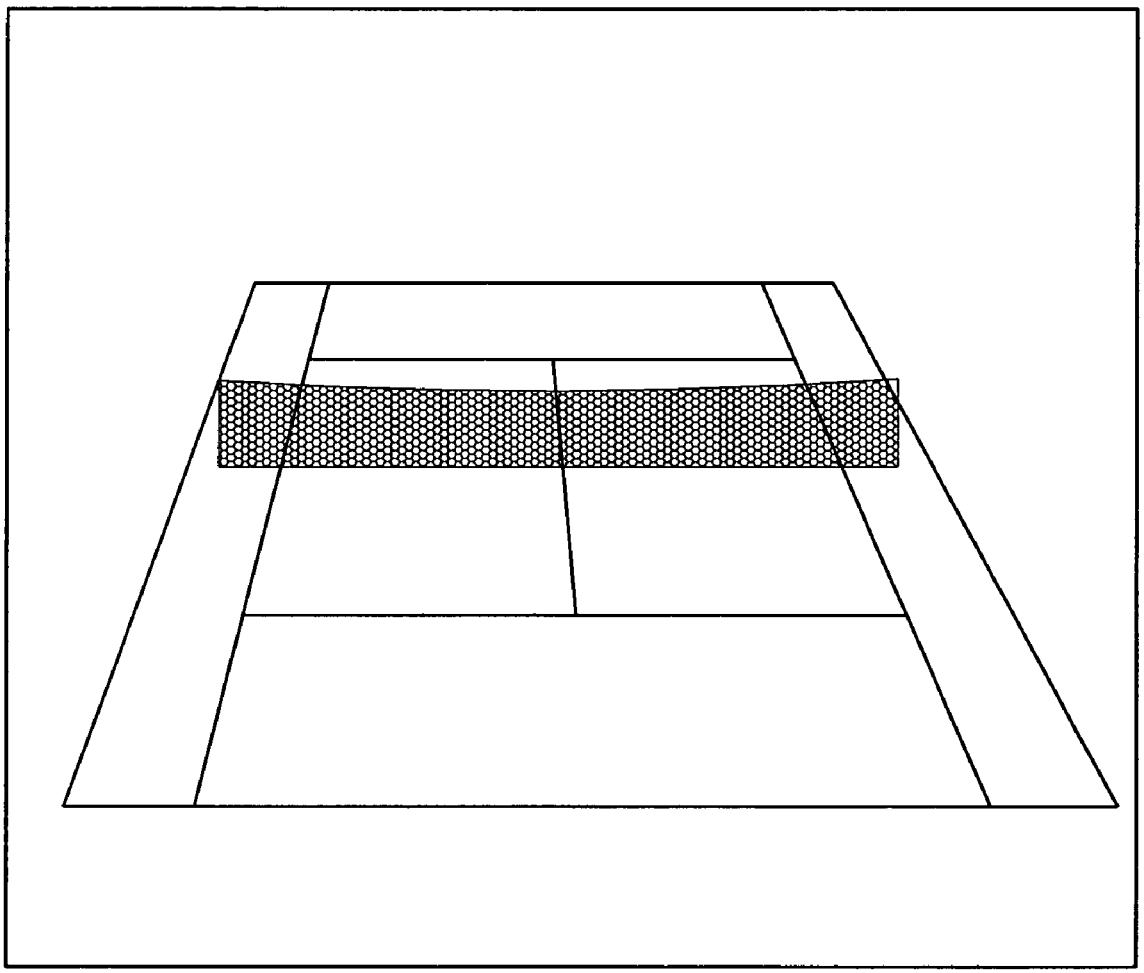
FIG. 5 is a diagram of a reconstructed frame of the present invention.

As described in step S261, after the sprite plane 131 is generated, a reconstructed frame 141 is obtained from the sprite plane 131 through a second transformation process. This second transformation process can be a coordination transformation process with an inverse matrix $M_{V2S}^{-1}$. Further, there is no foreground object 16 presented in the reconstructed frame 141, as shown in FIG. 5.

Figure 6:
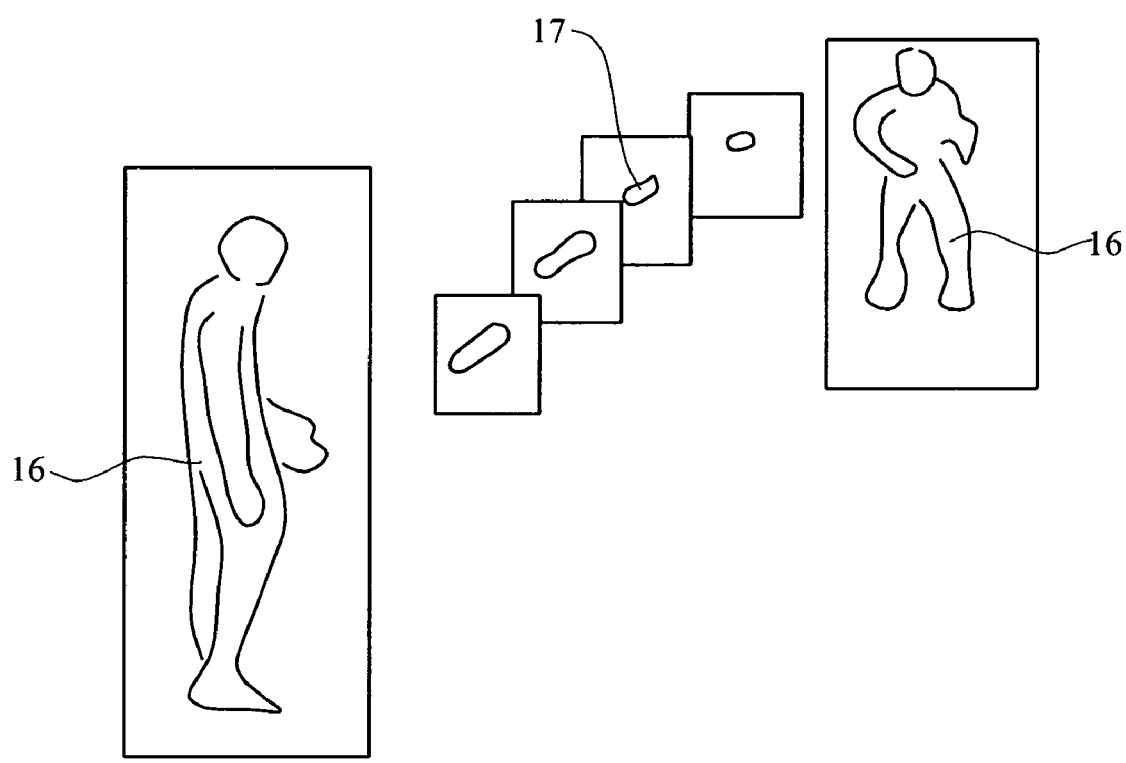
FIG. 6 is a diagram showing foreground objects of the present invention.

Then, in step S271, comparing the frame difference between the reconstructed frame 141 and the video frame 115 having the foreground objects is performed, so as to separate each individual foreground object 16/17, such as a player and a ball, for example, as shown in FIG. 6.

In step S281, finally, analyzing the information of the foreground object 16/17 of each video unit 11 is performed for annotating a hit event in the video unit 11. Moreover, it is possible to classify the video units 11 based on the annotated hit events, so as to allow viewers to click a desirable video unit immediately.

Figure 7:
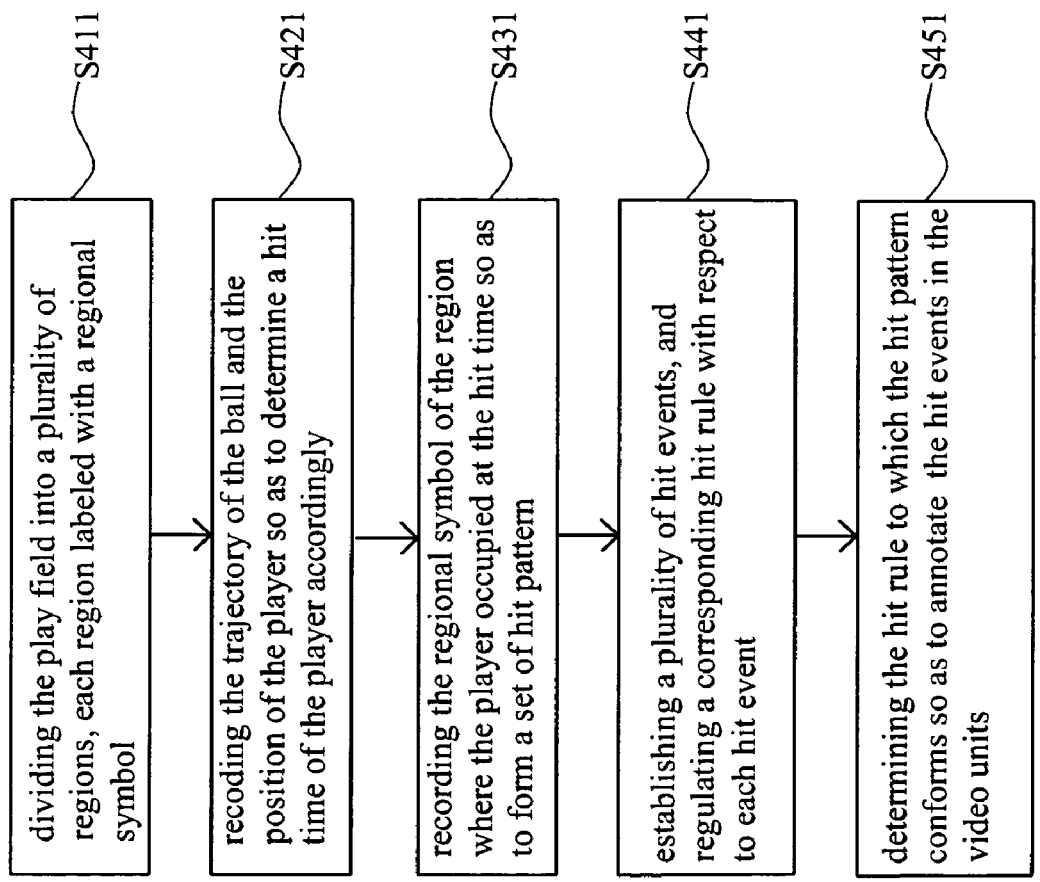
FIG. 7 is a flow chart for analyzing the information of foreground objects according to the present invention.

Referring to FIG. 7, there is shown a flow chart of the analysis of the information of the foreground object according to the present invention. In the game video, the hit frame is an excited video frame, such as Shooting in soccer, Strike out in baseball, or Ace in tennis. For the video 100, if each video unit 11 can be annotated with individual hit event, the viewers are allowed to not only click the desired hit frame immediately, but also review video highlights.

In the flow chart of the present embodiment, taking the tennis game as an example, it analyzes the information of the foreground object (e.g., a player 16, ball 17) in video 100 so as to annotate on a hit event in each of the video units 11.

First, as described in step S411, the sprite plane 131 comprises a play field 133 considered as the background scene. The play field 133 can be divided into a plurality of regions 134, each regions 134 being labeled with a symbol $a_1$, $b_1$, $c_1$, $d_1$, $e_1$, $a_2$, $b_2$, $c_2$, $d_2$, $e_2$, etc., as shown in FIG. 8.

Figure 9:
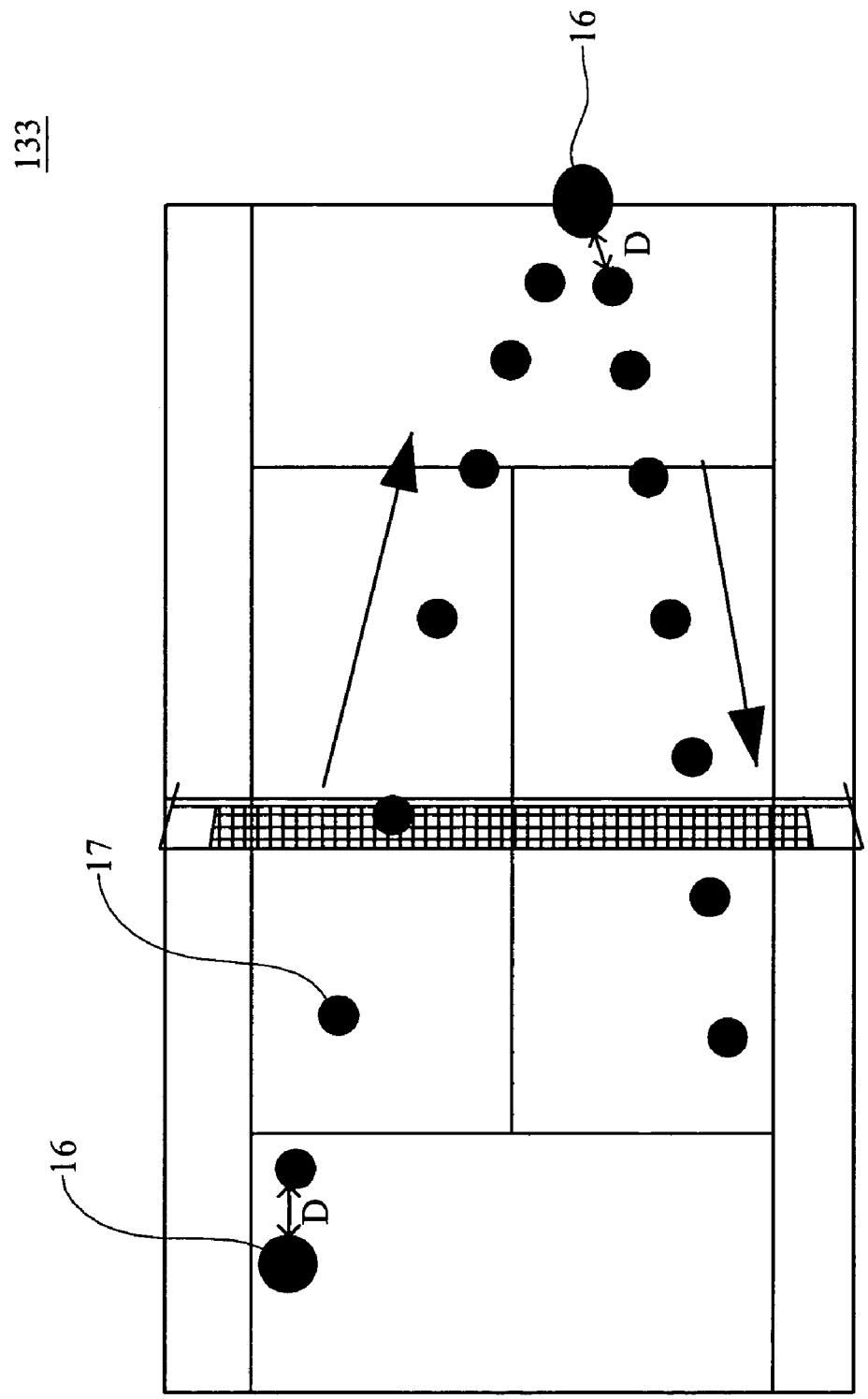
FIG. 9 is a diagram showing the play field with trajectories of balls and positions of players recorded therein according to the present invention.

In step S421, the trajectory of the ball 17 and the position of the player 16 can be recorded in the play field 133, and thus used as the time index of player's hitting with respect to a minimum distance D between the trajectory of the ball 17 and the position of the player 16, as shown in FIG. 9.

Figure 8:
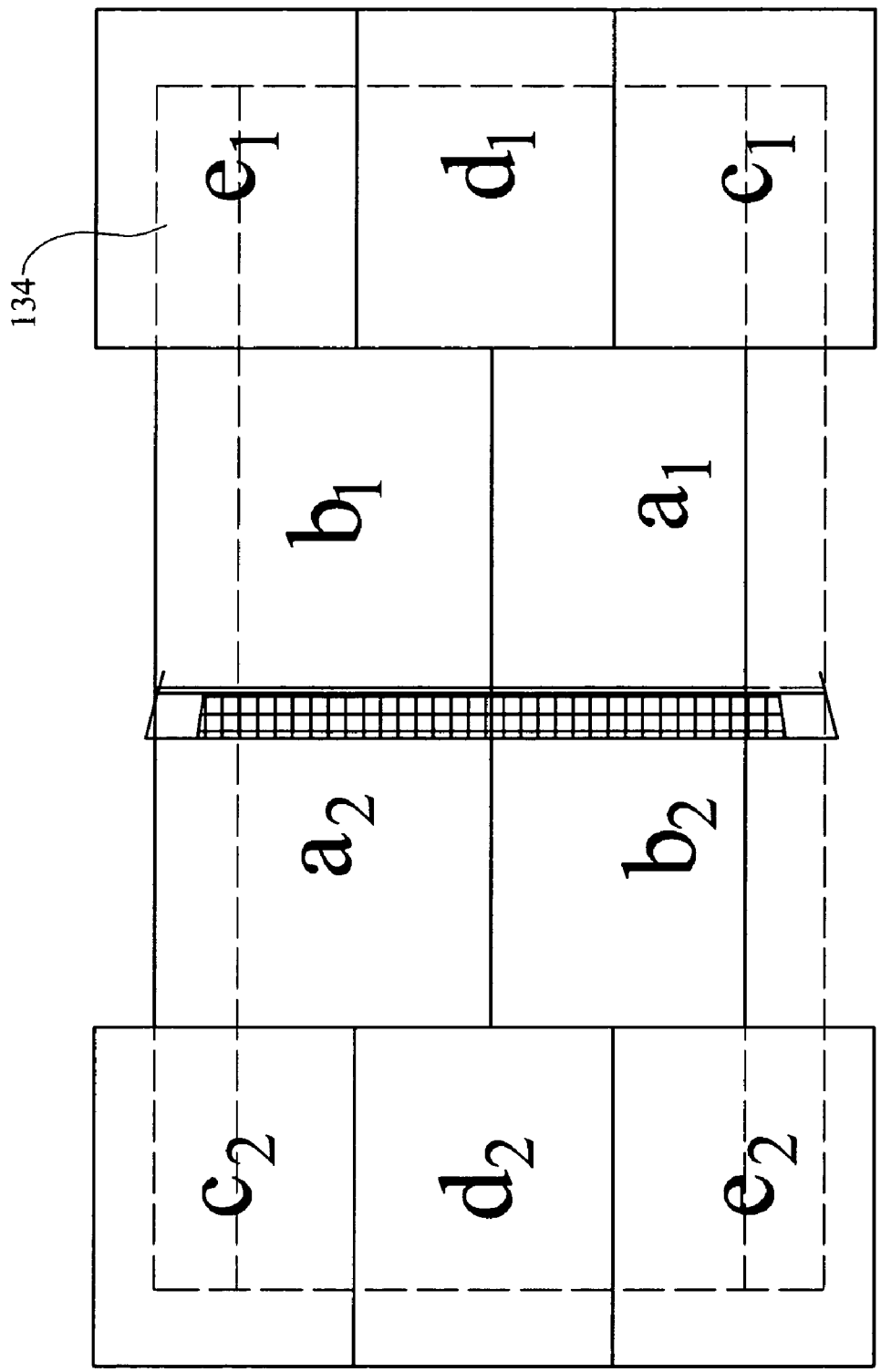
FIG. 8 is a configuration diagram of a play field according to the present invention.

As described in step S431, the symbols for the regions, e.g., region 134, where the players 16 occupied at the hit time can be recorded, and then combined as a set of hit pattern, such as ($c_2 d_1$) as shown in FIGS. 8 and 9.

In step S441, a plurality of hit events are established, such as Ace, Double fault, Rally, and Break point. And a corresponding hit rule to each hit event can be regulated individually. The hit rule for individual hit event can be regulated depending on the regions 134 occupied by the players 16 at the hit time. For example, the hit rule for Ace event is regulated as follows: the regions 134 occupied by the players 16 at the hit time may be $c_1$, $d_1$, $e_1$, $c_2$, $d_2$, or $e_2$, while the hit rule for Rally event is regulated as follows: the regions 134 occupied by the players 16 at the hit time may be $c_1$, $d_1$, $e_1$, $c_2$, $d_2$, or $e_2$. Naturally, the accurately establishment of hit event can further increase at least one hit rule, such as the number of symbol for the hit pattern. In step S451, the hit rule to which the hit pattern conforms is determined, in such a way the video unit 11 can be annotated with the hit event represented by the hit rule. For example, a set of hit pattern ($c_2 d_1$) obtained from the analysis of the video unit 11 conforms to the hit rule regulated depending on Rally event, and then the video unit 11 can be annotated with Rally event. In this case, accordingly, each video unit 11 having the target shot 113 can be annotated with the hit event individually.

Although the above embodiment is described for the tennis game as an example, it is also possible applied to other sports, such as baseball, archery, table tennis, and tennis, etc., practically. As such, the shot frame of interest in the sport game, such as Pitch shot, Shooting shot, for example, may be used for annotation of the video.

Figure 10A:
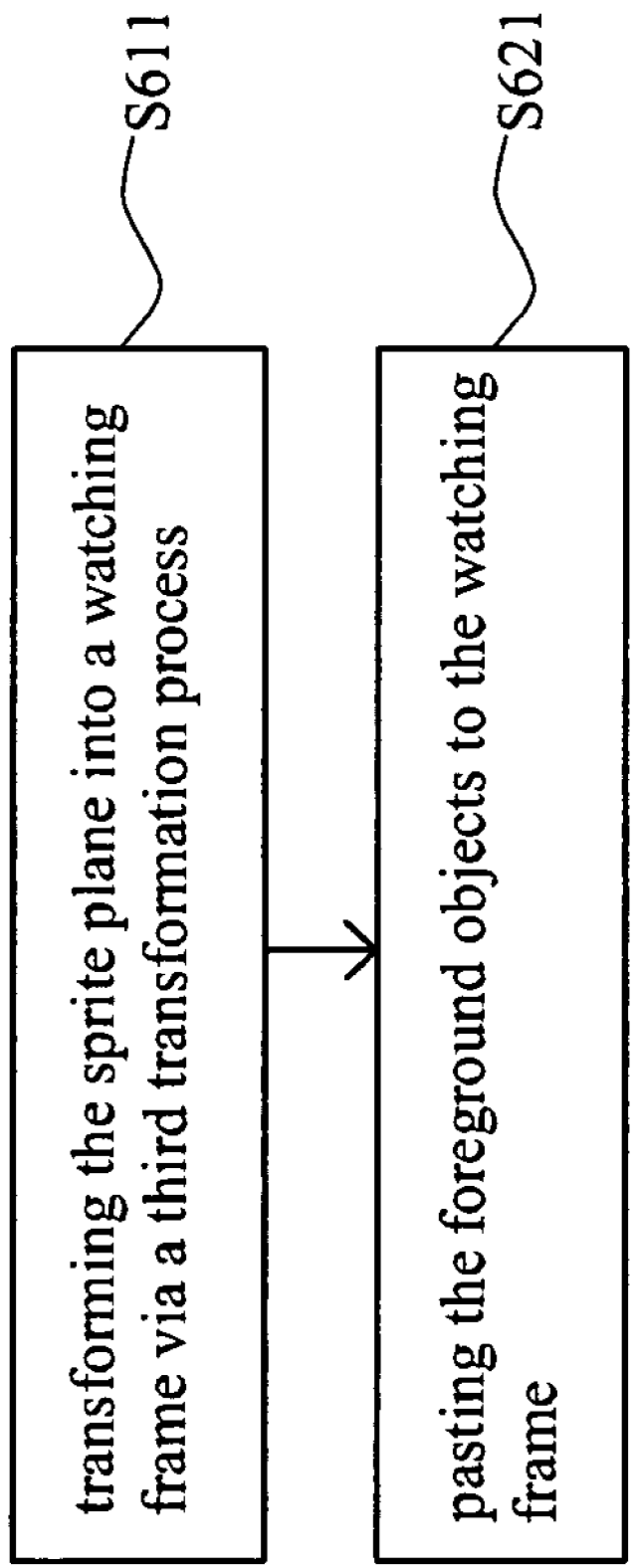
FIG. 10A is a flow chart of a method for rendering of video content according to one embodiment of the present invention.

Referring to FIG. 10A, there is shown a flow chart of a method for rendering of video content according to one embodiment of the present invention. In the flow chart of the present embodiment, the information extracted depending on the flow chart in FIG. 1 is reconstructed and video content of individual video unit 11 can be reintegrated arbitrarily according to users' request.

Figure 11:
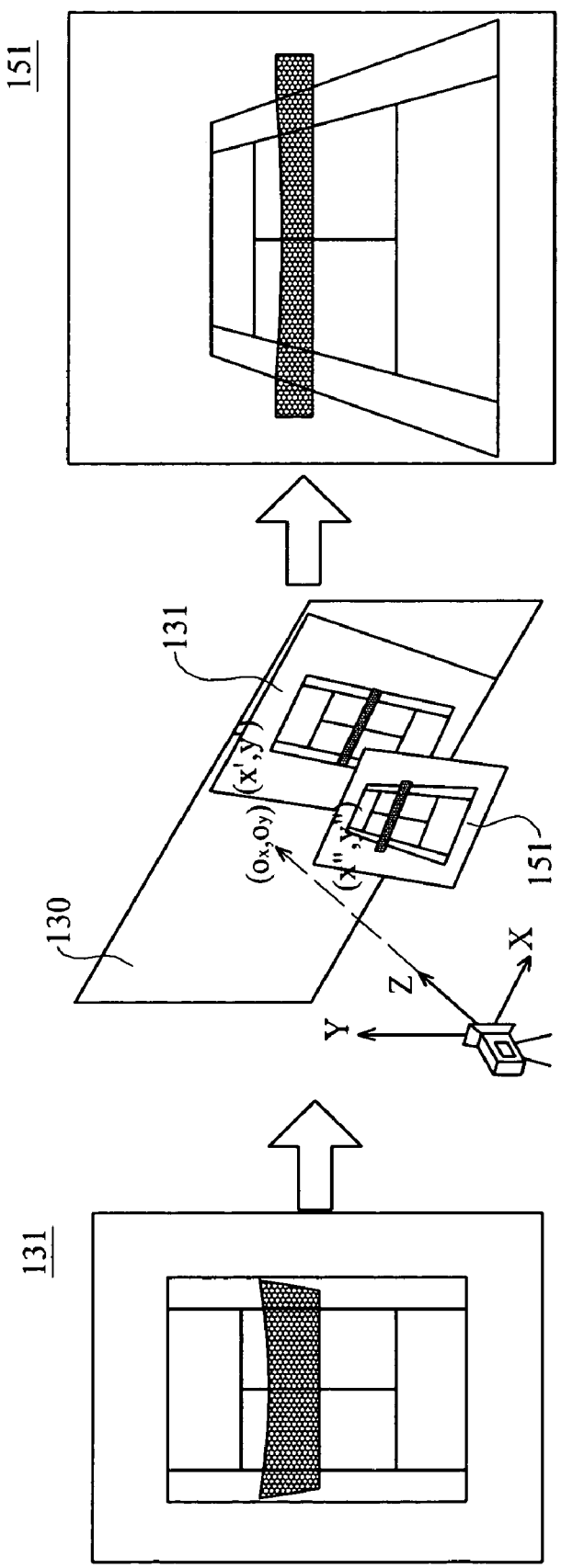
FIG. 11 is a diagram showing a process of transformation from the sprite plane into a watching frame according to the present invention.

First, as described in step S611, a watching frame 151 can be generated from the sprite plane 131 via a third transformation process, which can be a coordination transformation process with matrix $M_{S2W}$, used for the transformation of the sprite plane 131 in the background view 130 into the watching frame 151, as shown in FIG. 11. The transformation is performed as per formula (4) shown as follows:

$$\begin{bmatrix} x'' \\ y'' \\ w'' \end{bmatrix} = M_{S2W} \begin{bmatrix} x' \\ y' \\ w' \end{bmatrix} = \begin{bmatrix} m_{s1} & m_{s2} & m_{s3} \\ m_{s4} & m_{s5} & m_{s6} \\ m_{s7} & m_{s8} & 1 \end{bmatrix} \begin{bmatrix} x' \\ y' \\ w' \end{bmatrix} \quad (4)$$

Wherein, $m_{s1}$ to $m_{s8}$ are transformation factors of the matrix $M_{S2W}$, used for the transformation of the position coordination (x'/w', y'/w') in the sprite plane 131 into the position coordination (x''/w'', y''/w'') in the watching plane 151.

Subsequently, in step S621, each of the foreground objects (e.g., the player 16 and the ball 17) are pasted to the watching frame 151.

Further, the foreground object extracted from the video frame 115 can't be direct pasted to the viewing frame 151 due to possible different viewing angle between these two frames. Therefore, to paste these foreground objects on the watching frame 151, the computation of the coordination transformation for the foreground objects between the video frame 115 and the watching frame 151, and the size of the foreground objects are also adjusted to fit the scaling factor $S_W$. The coordination transformation process for the foreground object is illustrated by formula (5) shown as follows:

$$\begin{bmatrix} x_w \\ y_w \\ w_w \end{bmatrix} = M_{S2W} M_{V2S} \begin{bmatrix} x \\ y \\ 1 \end{bmatrix} = \begin{bmatrix} m_{w1} & m_{w2} & m_{w3} \\ m_{w4} & m_{w5} & m_{w6} \\ m_{w7} & m_{w8} & 1 \end{bmatrix} \begin{bmatrix} x \\ y \\ 1 \end{bmatrix} \quad (5)$$

Wherein, $m_{w1}$ to $m_{w8}$ are transformation factors of the matrix $M_{S2W} M_{V2S}$. The position coordination (x, y) of the foreground object in the video frame 115 is transformed into the position coordination ($x_w/w_w$, $y_w/w_w$) in the watching plane 151 through the matrix transformation of formula (5).

Additionally, a scaling factor $S_W$ for the adjustment of the size of the foreground object can be obtained in accordance with the variation in motion of the foreground object. For example, $\Delta x$ is the variation in motion of the foreground object in the video frame 115, while [$\Delta x_w, \Delta y_w, \Delta w_w$] is that in the watching frame 151. The scaling factor $S_W$ for the adjustment of the size of the foreground object is illustrated by formula (6) shown as follows:

$$S_W = \sqrt{\Delta\left(\frac{x_w}{w_w}\right)^2 + \Delta\left(\frac{y_w}{w_w}\right)^2} \quad (6)$$

By means of the scaling factor $S_W$, which is used for the adjustment of the size of the foreground object, the foreground object can be suitably adjusted in size, and then pasted on the watching frame 151. Moreover, in the present embodiment, the scaling factor $S_W$ equals to 1, when the transformation matrix $M_{S2W}$ is equivalent to $M_{V2S}^{-1}$.

Figure 10B:
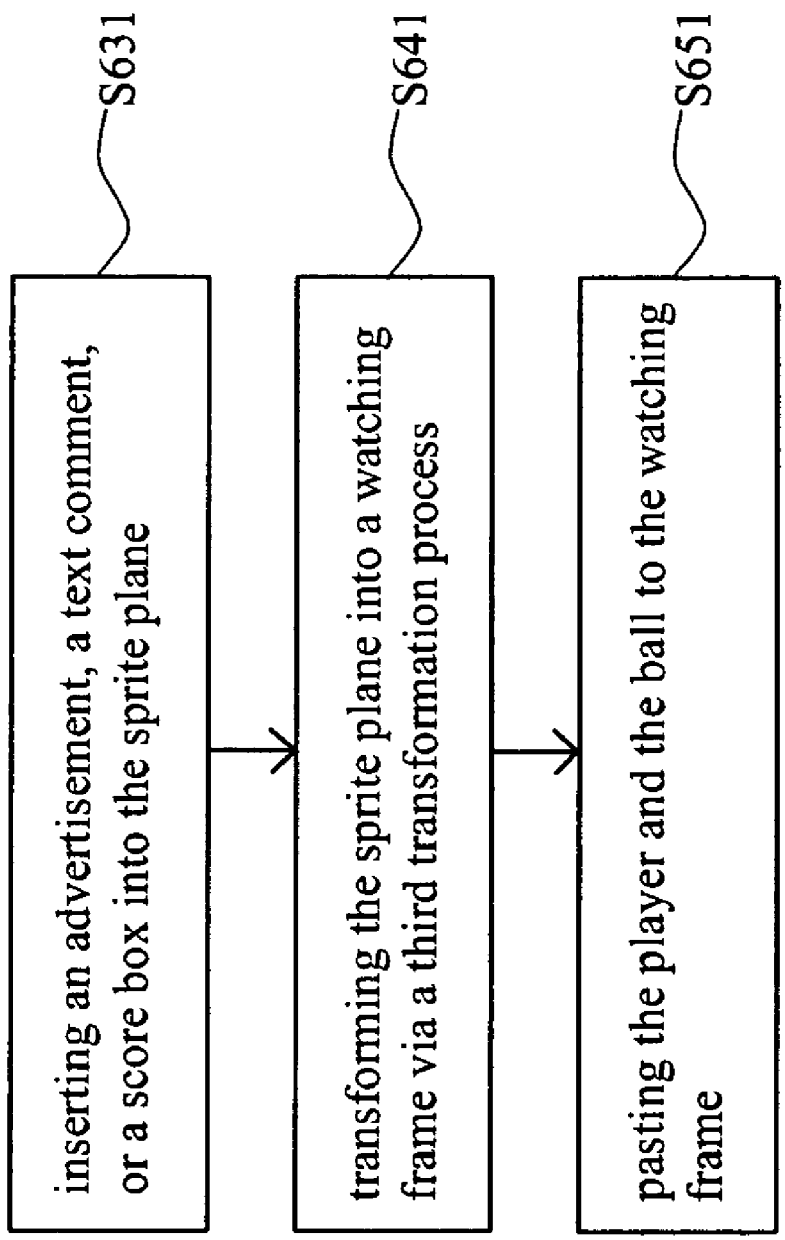
FIG. 10B is a flow chart of the method for rendering of video content according to another embodiment of the present invention.
Figure 12:
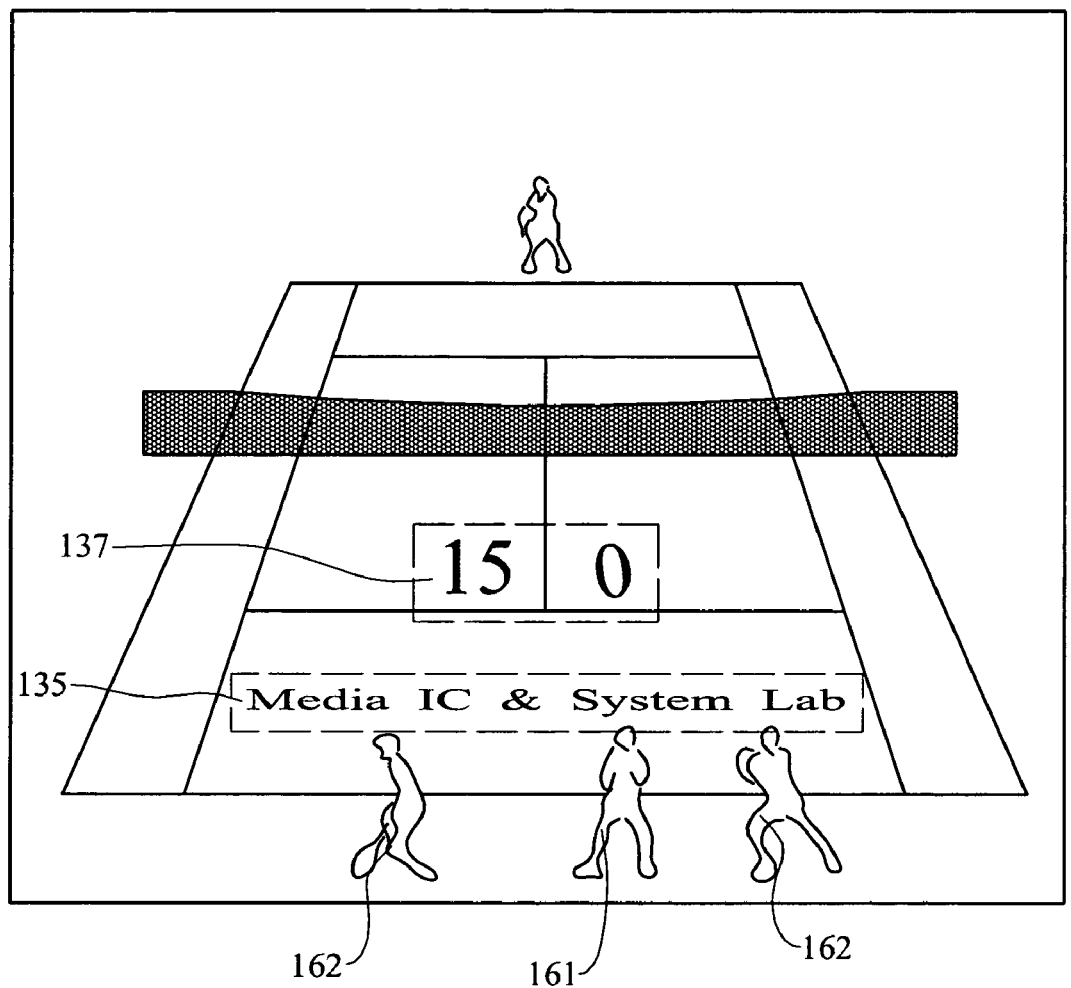
FIG. 12 is a diagram of the watching frame of the present invention.

Further, referring to FIGS. 10B and 12, there is shown a flow chart of a method for rendering of video content according to another embodiment of the present invention. In step S631, before the transformation of the sprite plane 131 into the watching frame 151 is performed, an advertisement, a text 135, or a score count 137 can be inserted the sprite plane 131, and thereby used to edit the sprite plane 131. Then, in step S641 similar to step S611, after the transformation of the sprite plane 131 into the watching frame 151 is completed, the plentiful visual effect can be generated in the latter. Subsequently, individual foreground object (e.g., the player 16 and the ball 17) can be pasted to the watching frame 151, as described in step S651.

Further, in one embodiment of the present invention, the current player and the previous player considered as objects 16 can be pasted to the watching frame 151 simultaneously, so as to generate a contiguous motion of the player 16 in this watching frame 151.

Otherwise, in another embodiment of the present invention, the watching frame 151 can be pasted with a current player considered as an object 161 and a player at hit time considered as an object 162, so as to enjoy the highlight of the hit time, as shown in FIG. 12.

Thereby, the foreground objects can be reintegrated in the background according to viewers' request, providing the viewers with a whole new experience, and thus more enjoyment on watching.

Figure 13:
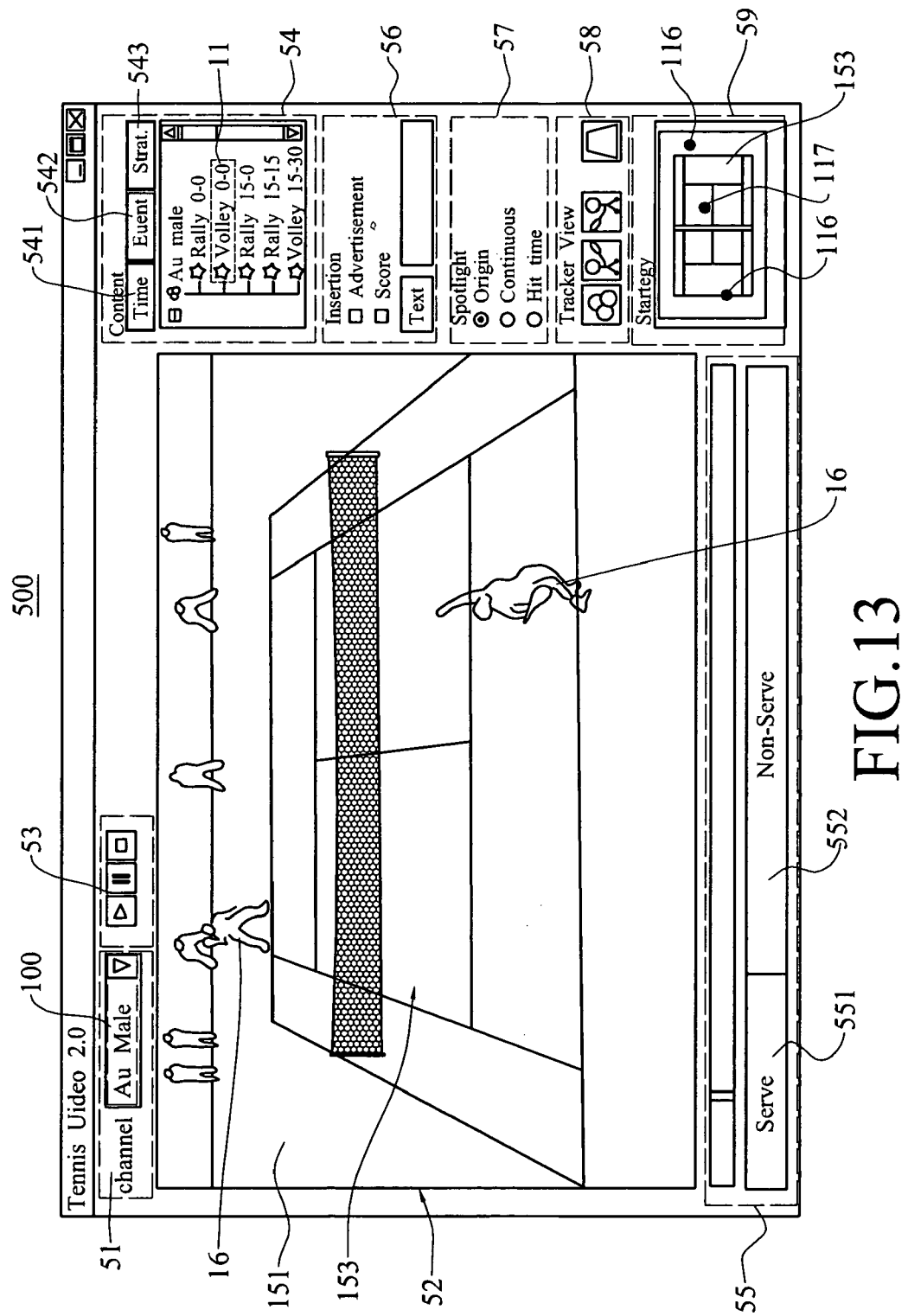
FIG. 13 is a configuration diagram of a user interface according to one embodiment of the present invention.
Figure 14:
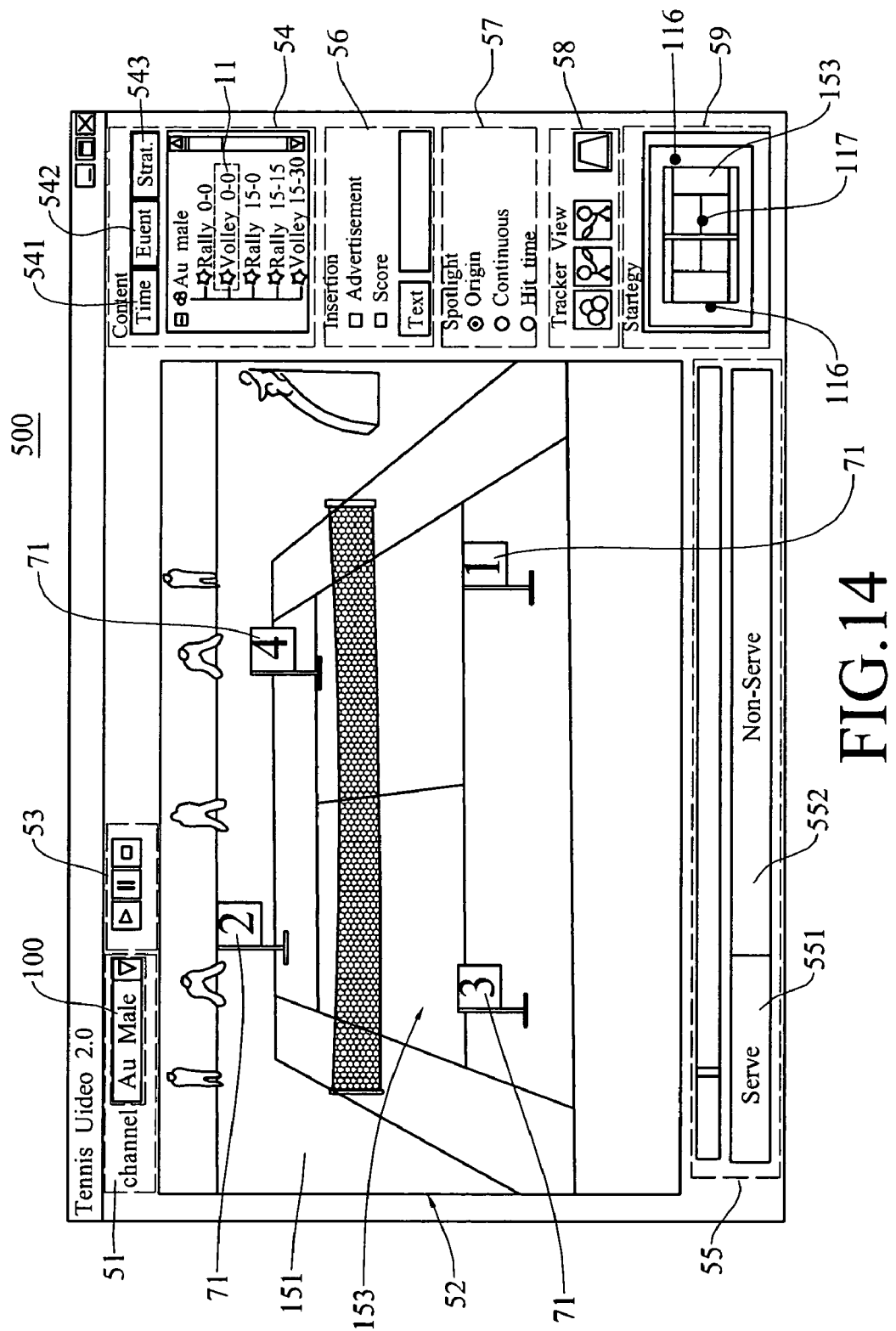
FIG. 14 is a configuration diagram of the user interface according to further embodiment of the present invention.
Figure 15:
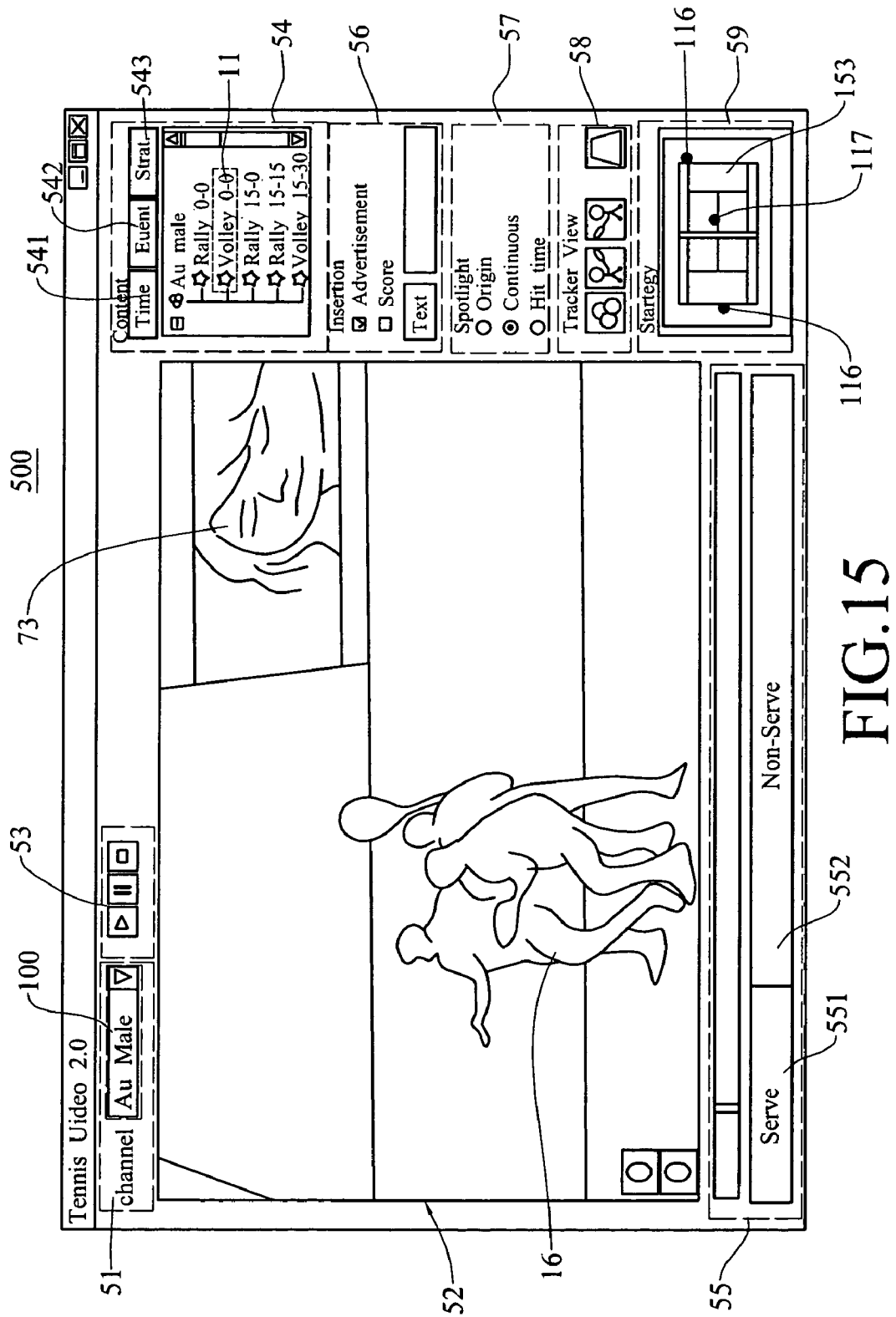
FIG. 15 is a configuration diagram of the user interface according to further embodiment of the present invention.

Referring to FIGS. 13, 14, and 15, there are shown configuration diagrams of user interface according to embodiments of the present invention, respectively.

As illustrated in FIG. 13, a user interface 500 of the present invention comprises a channel selection block 51, a play window 52, a function block 53, and a video content annotation block 54.

Wherein, the channel selection block 51 is used to select a television channel comprising a video 100, the video being a game video and comprising a plurality of video units 11. The play window 52 is used to play the video units 11. The watching frame 151 of each video unit 11 comprises a background scene and at least one foreground object, the background scene being a play field 153, while the foreground object being the player 16 and the ball.

The function block 53 is used to play, pause, or stop the video units 11. The video content annotation block 54 can list all the video units 11, each video unit with a comment text, such as Ace, Double fault, Volley, Rally, and Break point. The comment text is used to express the hit event represented by the individual video unit 11 in the game video 100.

Furthermore, the video content annotation block 54 comprises a sorting by time unit 541, a sorting by event unit 542, and a strategy search unit 543.

The sorting by time unit 541 is used to sort all the video units 11 in the video content annotation block 54 based on the play time of each video unit 11; while the sorting by event unit 542 is used to sort all the video units 11 in the view content annotation block 54 based on the hit events provided for annotation of the video units 11.

Referring to FIG. 14 in accompany with the flow chart in FIG. 7, the strategy search unit 543 is provided for users to mark at least one hit position 71 in the play field 153 of the watching frame 151. The hit position 71 in the watching frame 151 can be transformed into that in the sprite plane 131 through the inverse matrix $M_{S2W}^{-1}$. Then, each hit position 71 in the sprite plane 131 can be recognized with a corresponding regional symbol, in accordance with the play field 133 shown in FIG. 8. As such, a set of hit pattern can be formed. Subsequently, the strategy search unit 543 determines the hit event conformed by the hit pattern, so as to search out said video units annotated with said hit event in the video 100 and list the video units 11 in the video content annotation block 54. In this case, rapid browsed to favorite hit frames can be provided for viewers.

The user interface 500 further comprises a video progress bar 55, an insertion block 56, a spotlight block 57, an object tracking block 58, and a strategy map 59.

The video progress bar 55 is used to show that the video unit 11 played in the play window 52 is a video 11 of a serve shot 551 or one of a non-serve shot 552, and the play progress of the video unit 11.

The insertion block 56 is used to insert a text, a score box, or an advertisement 73 into the background scene 131, as shown in FIG. 15.

The spotlight block 57 is used to generate a contiguous motion for the clicked foreground object 16, as shown in FIG. 15, or to generate a motion at current time and one at a key time simultaneously for this clicked foreground object. Further, in the present embodiment, this key time means the hit time of the player.

For the object tracking block 58, it is used to track the foreground object, such as the player 16, and to control the virtual camera to focus on and then zoom in on the foreground object, facilitating viewers to watch the motion of this foreground object clearly.

The strategy map 59 is utilized to display the position of the foreground object (e.g., the player 16 or the ball) with respect to the play field 153 on the map. Thereby, viewers may discuss the winning strategies and easily analyze the information of the player 16, such as playing habit of the player, for example, by the use of positions of the player 16 and the ball presented on the strategy map 59.

To sum up, the user interface of the present invention provides several interactive functions, not only facilitating viewers to modify video content for the generation of plentiful visual effects, but also achieving the object of customizing video for the provision of more enjoyment on video watching to the viewers.

The foregoing description is merely one embodiment of the present invention and not considered as restrictive. All equivalent variations and modifications in shape, structure, feature, and spirit in accordance with the appended claims may be made without in any way from the scope of the invention.

What is claimed is:

1. A method for decomposition of video content, comprising the steps of: providing a video comprising a plurality of shots; detecting all of said shots of said video on the basis of a reference shot to recognize a plurality of target shots similar to said reference shot, each of said target shots comprising a sequence of video frame, said video frame comprising a background scene and at least one foreground object; decomposing said video into a plurality of video units based on a play time of each of said target shots; transforming said video frame into a sprite plane via a first transformation process; filtering off said at least one foreground object out of said sprite plane; transforming said sprite plane into a reconstructed frame via a second transformation process; and comparing the frame difference between said reconstructed frame and said video frame having all of said at least one foreground object, so as to separate each of said at least one foreground object.

2. The method for decomposition of video content according to claim 1, wherein a color histogram is used for the comparison of said reference shot and each of said shots for recognizing said target shots similar to said reference shot.

3. The method for decomposition of video content according to claim 1, wherein said step of filtering off said at least one foreground object out of said sprite plane further comprising the steps of: calculating a histogram bin of the pixel value for a period of time at individual position coordination in said video frame; and extracting a maximum pixel value from said histogram bin of the pixel value at individual position coordination in said video frame to be considered as the pixel value of each position coordination in said sprite plane.

4. The method for decomposition of video content according to claim 1, wherein said reference shot and said target shots are the serve shots, said background scene is a play field, and said at least one foreground object comprises a ball and at least one player.

5. The method for decomposition of video content according to claim 4, further comprising the step of: analyzing the information of said at least one foreground object of each of said video units so as to annotate on a hit event in each of said video units.

6. The method for decomposition of video content according to claim 5, wherein said step of analyzing the information of said at least one foreground object comprising the steps of: dividing said play field into a plurality of regions; labeling each of said regions with a regional symbol; recoding a trajectory of said ball and a position of said player so as to determine a hit time of said player accordingly; recording said regional symbol of said region where said player occupied at said hit time so as to form a set of hit pattern; establishing a plurality of hit events, and regulating a corresponding hit rule with respect to each of said hit events; determining said hit rule to which said hit pattern conforms; and annotating said hit events in said video units.

7. The method for decomposition of video content according to claim 6, wherein said hit time is a time index of player's hitting with respect to a minimum distance between said trajectory of said ball and said position of said player.

8. The method for decomposition of video content according to claim 6, wherein said hit rule is regulated depending on the number of symbols used for said hit pattern or said region occupied by said player at said hit time.

9. The method for decomposition of video content according to claim 1, further comprising a step of rendering of video content, comprising the steps of: transforming said sprite plane into a watching frame via a third transformation process; and pasting each of said at least one foreground object to said watching frame.

10. The method for decomposition of video content according to claim 1, further comprising a step of rendering of video content, comprising the steps of: inserting an advertisement, a text comment, or a score box into said sprite plane; transforming said sprite plane into a watching frame via a third transformation process; and pasting each of said at least one foreground object to said watching frame.

11. The method for decomposition of video content according to claim 6, further comprising a step of rendering of video content, comprising the steps of: inserting an advertisement, a text comment, or a score box into said sprite plane; transforming said sprite plane into a watching frame via a third transformation process; and pasting said player and said ball to said watching frame.

12. The method for decomposition of video content according to claim 11, wherein said watching frame is pasted with said player at current time and that at previous time simultaneously.

* * * * *